United States Patent [19]
Muslin

[11] 3,895,177
[45] July 15, 1975

[54] FLEXIBLE METAL CONDUIT WITH END CONNECTORS AND METHOD OF MAKING THE SAME

[75] Inventor: Bernard J. Muslin, Chicago, Ill.

[73] Assignee: Specialty Connector Corporation, Chicago, Ill.

[22] Filed: Mar. 12, 1973

[21] Appl. No.: 339,633

[52] U.S. Cl............... 174/48; 174/65 R; 174/77 R; 174/78; 285/161; 285/256
[51] Int. Cl............................................. H02g 3/06
[58] Field of Search........... 174/65 R, 78, 77 R, 48; 285/149

[56] References Cited
UNITED STATES PATENTS

| | | |
|---|---|---|
| 2,687,904 | 8/1954 | Tornblom .......................... 285/149 |
| 2,821,567 | 1/1958 | Bergan.................................. 174/78 |
| 3,104,277 | 9/1963 | Bossu ............................. 174/77 R X |
| 3,142,721 | 7/1964 | Long.................................. 174/65 R |
| 3,454,291 | 7/1969 | Goldsobel et al. ......... 174/65 R UX |

Primary Examiner—J. V. Truhe
Assistant Examiner—David A. Tone
Attorney, Agent, or Firm—Dressler, Goldsmith, Clement & Gordon, Ltd.

[57] ABSTRACT

An open-ended metal conduit covered with an air-impervious compressible resilient material and provided with end connectors is made as a pre-assembly for subsequent connection to electrical equipment by forcing an indentation-forming tool against the sleeve portions of the end connectors enveloping the ends of the conduit to deform the metal inwardly to form at least one continuous annular rib which bites into but does not penetrate through the covering of compressible resilient material, to form a continuous air tight seal between the sleeve portion of the end connectors and the covering of compressible resilient material. Electrical connection between each end connector and the conduit for grounding purposes is most advantageously made by means of a flanged metal contact-forming member having a split shank portion frictionally fitting into the adjacent end of the conduit and a split flanged portion sandwiched between an annular axially inwardly facing shoulder on the head portion of the connector and the end edge of the metal conduit.

5 Claims, 8 Drawing Figures

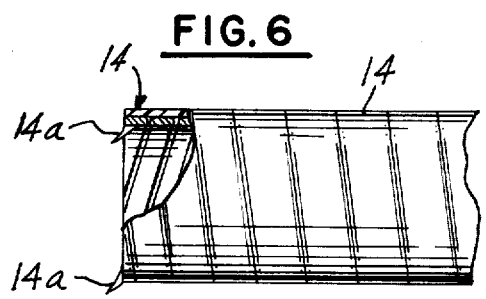
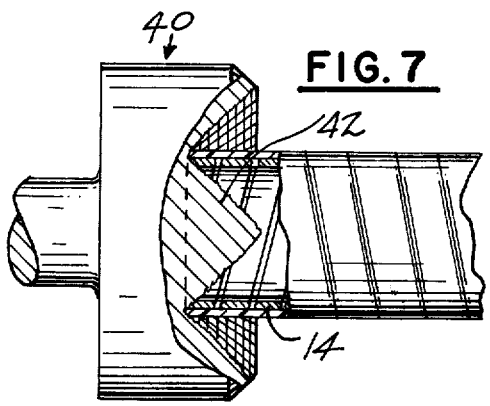
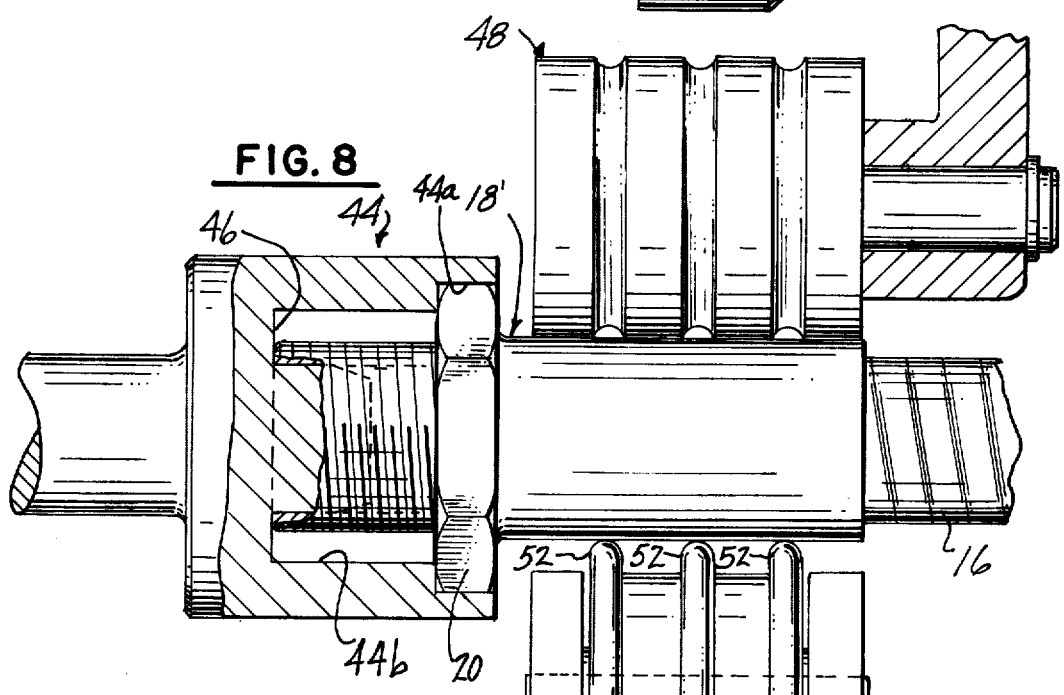
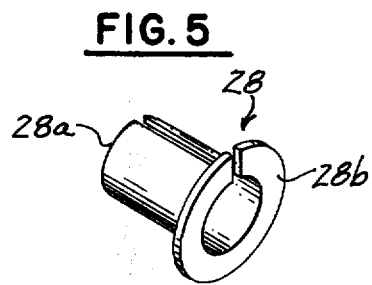
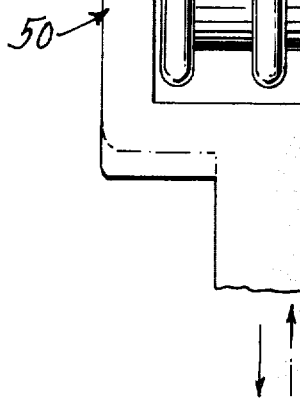

FLEXIBLE METAL CONDUIT WITH END CONNECTORS AND METHOD OF MAKING THE SAME

Flexible metal conduits containing electrical wiring and end connectors sealed around the ends of the conduits are provided between electrical devices and junction boxes in environments where the electrical code requires sealed connections to prevent electrical sparks from gaining access to flammable materials through spaces left by an improper fitting or connection between the end connectors and the ends of the metal conduits which they envelope. The end connectors commonly are adapted to extend through openings in the housings of the electrical devices and junction boxes and receive nuts and sealing gaskets or the like which sealingly anchor the same to the housings.

One of the most important applications for such a flexible metal conduit with sealed end connectors is for lighting fixtures mounted in drop-ceilings forming a plenum in forced air heating systems. In such environments, code requirements are particularly severe with regard to isolating the electrical system from the air in the return plenum. In such case, while it would be desirable for the lighting fixture manufactures to sell their fixtures with the attached metal conduit and sealed end connectors ready to be connected to junction boxes, because of the difficulty heretofore encountered in providing properly sealed pre-assembled end connectors for the conduits, the electrical contractors generally were given the responsibility of assembling the conduit and end connectors at the situs of the fixtures installation. These end connectors, which usually included sealing rings and threaded connectors, are relatively expensive to install, and require special test procedures to determine if they provide effective seals.

The present invention provides a pre-assembled conduit with end connectors sealed around the ends thereof which results in a great savings to the user since the pre-assembly can be fabricated at a modest cost and requires no testing or special assembly procedures at the situs of the fixture installation. Also the pre-assembled conduit with sealed end connectors can be mounted on the lighting fixtures by the fixture manufactures in their manufacturing plants, so only their connection to junction boxes is required at the fixture installation. The invention utilizes a unique method and means for connecting end connectors to a flexible conduit in a manner where there is no question but that a proper air-tight seal is effected, unlike other types of connectors where the nature of the connector design makes it questionable whether a proper seal is made.

The most preferred form of the present invention includes as assembly of a flexible open-ended metal conduit, most advantageously of the type which is coated with a synthetic rubber-like plastic material, so it is air impervious, compressible and resilient. A coupling or connector is provided at each end of the metal conduit which includes an air impervious metal sleeve portion enveloping the compressible resilient material at the adjacent end of the conduit, the metal sleeve portion having at least one and preferably three inwardly projecting continuous annular ribs pressed into the compressible resilient material without penetrating the same, to form at least one and preferably three continuous air-tight seals between the sleeve portion of each connector and the compressible resilient material. Each connector may have an outer head portion which forms a wiring passageway communicating with the conduit interior and which is adapted to be anchored and sealed to the margins of a wall opening in the housing of an electrical device or junction box.

The ribs of the sleeve portions of the connectors are most advantageously formed by mounting the assembly of the conduit with the end connectors in enveloping relationship with the outer ends thereof in a rotating support, which may comprise a pair of rotating chuck members receiving the end connector members and rotating the same. A backing die member is positioned on one side of each of the sleeve portions of each rotating end connectors, and a groove-forming die having groove-forming projections is placed on the opposite side of the same and forced against the rotating sleeve portion to form an annular groove which forces the metal of the sleeve portion into the compressible resilient material along a continuous band.

Electrical connection between each end connector and the conduit, which is generally required so the conduit may be suitably grounded, is most advantageously provided by a contact-forming member having a hollow split shank portion friction fitted within the adjacent open end of the conduit and a radially outwardly extending head or flange portion which is sandwiched between an axially inwardly facing shoulder formed on the head portion of the connector involved and the outer edge of the conduit. A head portion is split in alignment with the split portion of the shank portion. The split contact-forming member is a resilient member which is compressed slightly to enable it to be friction fitted in the conduit.

The above and other advantages and features of the invention will become apparent upon making reference to the specification to follow, the claims and the drawings wherein:

FIG. 5 is a perspective view of a contact-forming member forming part of the assembly shown in FIG. 3 which member makes electrical connection between one of the end connectors and the metal conduit shown therein.

FIG. 6 illustrates burrs formed at one of the ends of the conduit forming part of the conduit and end connector assembly shown in FIGS. 1-4;

FIG. 7 shows the manner in which the burr is removed from the end of the conduit shown in FIG. 6; and FIG. 8 illustrates the manner in which an end connector blank is sealed over one of the ends of the conduit shown in FIG. 7.

Figure 1:
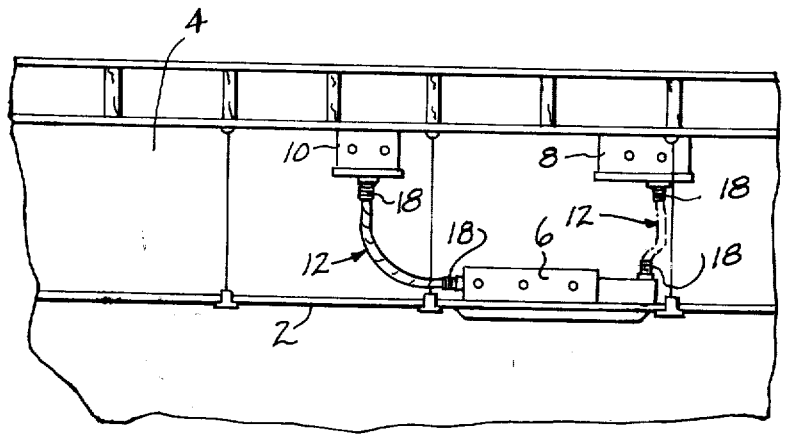
FIG. 1 is a sectional view through a drop ceiling showing a lighting fixture and junction boxes mounted within a plenum formed in part by the drop ceiling, and wherein the lighting fixture is connected to a junction box by flexible metal conduits with end connectors, constituting the present invention.

Referring now more particularly to FIG. 1, shown therein is a drop ceiling 2 defining a plenum space 4 in which air can be circulated in a heating or air conditioning system. A lighting fixture 6 is shown mounted in the drop ceiling 2, and connected to junction boxes 8 and 10 by metal conduit and connector assemblies 12–12'. In a manner to be described, the metal conduit and connector assemblies 12–12' are constructed in such a way that the interior of the metal conduits are isolated from the air in the plenum space 4, so that any sparks which may develop within the electrical portion of the system illustrated cannot gain access to the plenum space 4.

Figure 2:
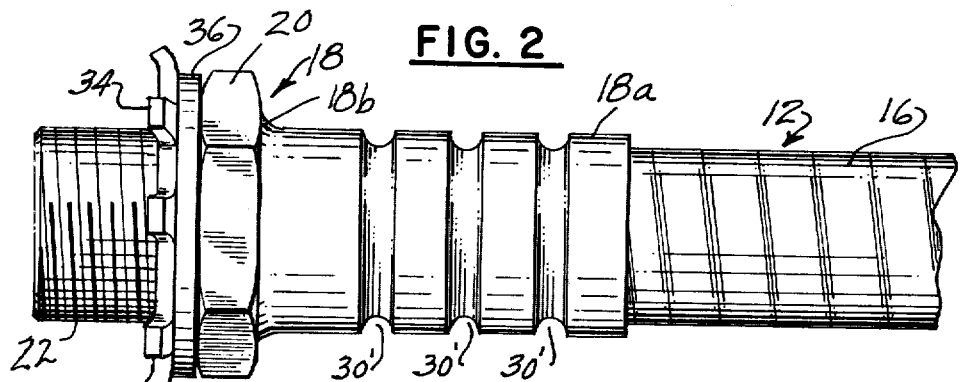
FIG. 2 is a greatly enlarged fragmentary side elevational view of one end of one of the conduits and attached end connector shown in FIG. 1.
Figure 3:
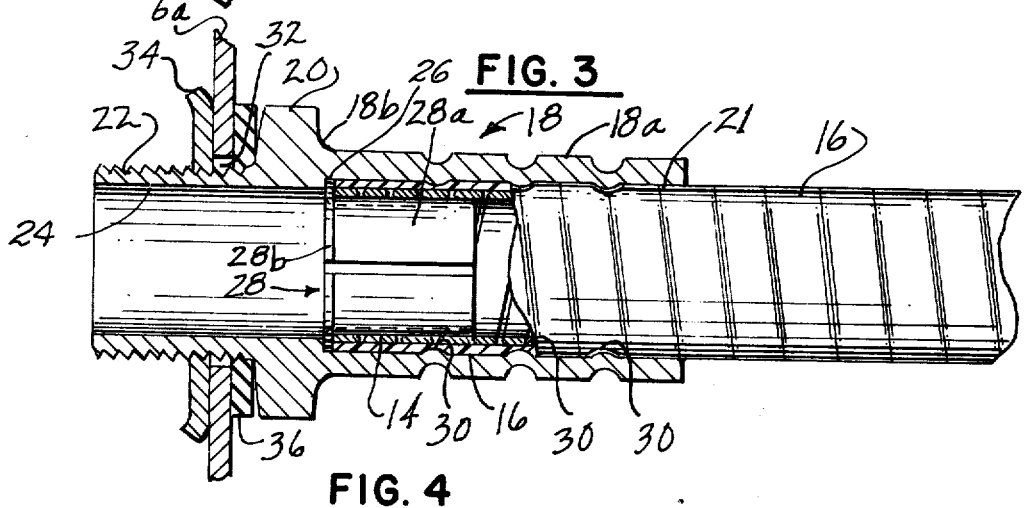
FIG. 3 is a partial sectional view through the portion of the conduit and attached end connector shown in FIG. 2.
Figure 4:
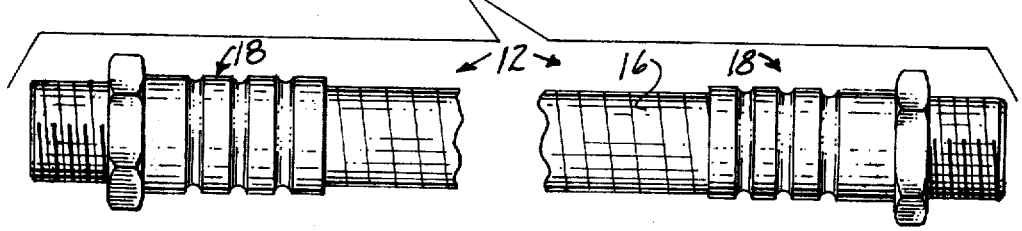
FIG. 4 is a broken-away view of one of the conduits shown in FIG. 1 with the end connectors at both ends shown therein.

Refer now to FIGS. 2–4 which illustrate in more detail than FIG. 1 the construction of the conduit and end connector assemblies 12–12'. As there shown, each conduit and end connector assembly 12 includes a flexible conduit 14 commonly referred to as BX conduit having a covering 16 of an air impervious synthetic plastic rubber-like material, such as poly vinyl chloride, which forms an air impervious resilient compressible air-tight covering over the metal conduit 14.

A connector 18 is secured to each end of the conduit, each connector most advantageously being an imperforate (i.e., air impervious) metal member having a cylindrical sleeve portion 18a receiving and enveloping one end portion of the plastic covered conduit 14. Each connector 18 further has a head portion 18b preferably with a hexagonally shaped flange 20 terminating in an externally threaded axially extending cylindrical neck 22. The sleeve portion 18a of each connector defines a cylindrical passageway 21 therein which communicates directly with a cylindrical open ended passageway 24 formed in the head portion 18b of the connector, the latter passageway 24 being somewhat smaller than the passageway 21 and forming at the intersection thereof an inwardly axially facing annular shoulder 26 facing the outer edge of the adjacent end of the conduit 14.

A contact-forming member 28 electrically interconnects the metal connector 18 and the adjacent end of the conduit 14. The terminal-forming member 28 at each end of the conduit 14, as illustrated, includes a split shank portion 28a which is friction fitted within the interior of the conduit 14 and a split flanged outer end portion 28b which is sandwiched between the annular shoulder 26 of the head portion 18b of the connector 18 and the outer edge of the conduit 14. The head portion is split in alignment with the split portion of the shank portion.

Each connector 18 is sealingly secured around the end of the plastic covered conduit 14 by continuous inwardly extending annular ribs 30—30—30. These ribs may be formed by forcing the metal forming the sleeve portion 18a inwardly along annular bands therealong, to cause the metal of the connector to deform into the compressible resilient covering material 16 to an extent where it does not penetrate the same. The resiliency of the compressible resilient covering material 16 then forms a seal along the ribs 30—30—30, thereby preventing any passage of sparks or air between the sleeve portion 18a of each connector 18 and the interior of the conduit 14.

The connector 18 at each end of the conduit section is designed to effect a sealed anchoring connection within an opening 32 in a wall of the housing of a junction box electrical device or the like, with which the combined conduit and connector assembly 12 is to be utilized. As shown in FIG. 3, the hexagonal flange 20 of the head portion 18b of the connector 18 nearest the fixture 6 is shown passing through an opening 32 in the wall 6a of the housing of the fixture 6. The threaded outer portion 22 of the head portion 18b of the connector 18 extends through the opening 32 and receives a lock knot 34 or the like which bears against the inner surface of the housing wall 6a. A sealing ring 36 is preferably utilized to form an air-tight seal at the point where the threaded portion 22 of the connector 18 passes into or from the opening 32.

The connector 18 at the other end of each conduit and end connector assembly 12 is constructed and mounted in the manner shown in FIG. 3.

The construction of the conduit and connector assembly 12 is such that it can be readily pre-assembled in a very inexpensive manner. Reference should now be made to FIGS. 6–8. FIG. 6 shows a plastic covered flexible conduit section 14 after it has been severed from a roll of such plastic covered conduit by a severing operation which leaves burrs 14a at each end thereof. FIG. 7 illustrates a burr removing unit 40 with a conical burr removing tool 42 extending within the burred end of the conduit section 14 shown in FIG. 6. The rotation of the burr removing tool 42 severs the burrs 14a from the end of the conduit 14 to form a clean outer edge portion thereon. Next, a pair of contact-forming members 28—28 are inserted in the opposite ends of the de-burred conduit and a pair of connectors 18—18 are applied around each end of the plastic covered conduit section involved, the connectors being fully pushed over the end of the conduit so the flanges 28—28 of the contact-forming members 28—28 are sandwiched between the shoulders 26—26 of the connectors and the de-burred ends of the conduit.

The connectors 18—18 at each end of the conduit 14 is then each placed within a rotatable chuck 44 as shown in FIG. 8 having an outermost cavity section 44a shaped to received the hexagonal flange 20 of the head portion 18b of the associated connector 18 and an inner cavity portion 44b into which the threaded neck 22 of the connector extends. The outer ends of the connectors 18—18 at each end of the conduit are sandwiched between the inner defining walls 46—46 of the chucks involved. The chucks 44—44 are then rotated to effect rotation of at least the associated end connectors 18—18. A pair of die members 48-50 are positioned on opposite sides of the sleeve portion 18a of each connector 18, the die 48 forming a stationary backing for the rotating sleeve portion 18a of the connector 18 involved, and the die member 50 as illustrated being provided with three metal indenting tools 52—52—52 which are moved radially into the sleeve portion 18a while the same is rotating to form outer indentations 30'—30'—30' (FIG. 2) in the outer surface of the sleeve portion 18a which forces metal inwardly to form the aforementioned ribs 30—30—30 which extend into the compressible resilient material 16 covering the conduit 14.

The aforementioned manner in which the connectors are sealed around the plastic covered conduit 14 provides a very reliable and inexpensive process to manufacture pre-assembled conduit and end connector assemblies which can be sold to lighting fixture and other manufacturers, and to electrical contractors.

It should be understood that numerous modifications may be made in the most preferred form of the invention and in the process of making the same described, without deviating from the broader aspects thereof.

I claim:

1. In combination with a flexible metal conduit having a covering of an air inpervious compressible resilient material extending adjacent the ends thereof, connectors secured to the ends of said conduit, each of said connectors comprising an air impervious sleeve portion enveloping the compressible resilient material adjacent the end of the conduit and having at least one continuous annular indented portion projecting into said compressible resilient material to anchor the sleeve portion in place thereon and to form at least one continuous air tight seal around the conduit between said sleeve portion of each connector and the compressible resilient material, each of said connectors having a head portion extending from the outer end of said sleeve portion thereof and adapted to extend through and be anchored and sealed about the margins of a wall opening, and the head portion of each connector forming a passageway for electrical wiring communicating with the interior of the conduit, and means forming an electrical connection between the sleeve portion of each connector and said conduit comprising a hollow resilient contact-forming member having an open ended split shank portion extending into and making a friction fit contact with the inner surface of the adjacent end of the conduit, said shank portion terminating in a radially outwardly extending flange portion sandwiched in contacting relation between an axially inwardly facing shoulder of said connector and the outer edge of the conduit said flange portion being split in longitudinal alignment with the split in the shank portion.

2. The combination of claim 1 wherein said sleeve portion has an inwardly extending portion which is relatively narrow to form an annular projecting rib.

3. The combination of claim 2 wherein the sleeve portion of each of said connectors has at least two inwardly projecting ribs extending into and compressing said compressible resilient material to form a number of continuous annular air sealed bands around the compressible resilient material covering the conduit.

4. The combination of claim 1 combined with an electrical device having a housing, said conduit having electrical wiring and the electrical wiring containing conduits extending from said housing, and the head portion of one of said connectors passing through and being anchored and sealed about the margins of an opening in said electrical device housing.

5. The combination of claim 1 combined with an electrical lighting fixture having a housing mounted in a drop ceiling forming a defining wall of an air circulating plenum, said conduit having electrical wiring and the electrical wiring containing conduit being in said plenum and extending from said lighting fixture housing, and the head portion of one of said connectors passing through and being anchored and sealed about the margins of an opening in said lighting fixture housing.

* * * * *